United States Patent

Palliser et al.

(10) Patent No.: US 6,666,519 B2
(45) Date of Patent: Dec. 23, 2003

(54) SEAT BELT WITH A BUCKLE TONGUE STOP

(75) Inventors: Martyn Palliser, Carlisle (GB); John F. Bell, Carlisle (GB); Andrew Park, Wigton (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 187 days.

(21) Appl. No.: 09/904,215

(22) Filed: Jul. 12, 2001

(65) Prior Publication Data

US 2002/0153760 A1 Oct. 24, 2002

(30) Foreign Application Priority Data

Apr. 23, 2001 (GB) ............................................ 0109933

(51) Int. Cl.7 ............................................... B60R 22/46
(52) U.S. Cl. ....................... 297/483; 297/481
(58) Field of Search .................. 297/468, 481, 297/483; 280/801.1, 808

(56) References Cited

U.S. PATENT DOCUMENTS

| 3,929,351 A | * | 12/1975 | Fricko |
| 3,941,419 A | * | 3/1976 | Blom |
| 4,101,170 A | | 7/1978 | Mori et al. .................. 297/389 |
| 4,223,917 A | | 9/1980 | Mori et al. .................. 280/806 |
| 6,405,412 B1 | * | 6/2002 | Bell |

FOREIGN PATENT DOCUMENTS

GB 2252491 8/1992

* cited by examiner

Primary Examiner—Laurie K. Cranmer
(74) Attorney, Agent, or Firm—Lonnie R. Drayer

(57) ABSTRACT

A seat belt has a buckle tongue stop that is resiliently deformable. The buckle tongue stop may be deformable laterally or in its width and may be formed of compressible bumps. The seat belt allows a child seat to be secured in a vehicle according to European regulations yet still enables the buckle tongue to be supported on the belt webbing at a convenient location for an adult vehicle occupant.

8 Claims, 2 Drawing Sheets

SEAT BELT WITH A BUCKLE TONGUE STOP

FIELD OF THE INVENTION

The present invention relates to a seat belt having a buckle tongue stop that is resiliently deformable.

BACKGROUND OF THE INVENTION

A traditional three-point seat belt restraint has a length of belt webbing connected to the vehicle, at one end to the floor and at the other end to a retractor. The belt webbing passes over a loop fastened to a side pillar of the vehicle and through an aperture in a buckle tongue. The position of the buckle tongue is adjustable on the belt webbing since the belt webbing slides freely through the aperture. The buckle tongue can be inserted in a buckle fixed to the vehicle on an opposite side of the vehicle occupant so that, when buckled, the belt passes over both the lap of the vehicle occupant and diagonally across the vehicle occupant's torso.

When the seat belt is unbuckled, spare belt webbing is automatically wound into the retractor and adopts a length corresponding to the distance between the retractor and the pillar loop and the buckle tongue tends to slide down the belt webbing. To ensure that the buckle tongue hangs in a position accessible to a vehicle occupant, it is known to put a buckle tongue stop in the form of a button on the belt webbing at a suitable location to prevent the buckle tongue from falling all the way to the floor. However, this buckle tongue stop can cause problems when the seat belt is used to restrain a child seat. European regulations dictate that there must be no loose belt webbing in either the lap or the diagonal torso portions. The buckle tongue stop could leave loose belt webbing in the lap portion when the belt is fastened around a child seat because the buckle tongue stop effectively prevents all of the belt webbing in the lap portion form being pulled in. If the buckle tongue stop is put in a position which avoids loose belt webbing in this situation, when the belt is unlatched, the buckle tongue hangs too low to be convenient for the seat occupant.

According to the present invention, there is provided a seat belt having a buckle tongue stop that is resiliently deformable.

The buckle tongue stop may be resiliently deformable in the direction of its width, that is to say laterally, or in its thickness and may be formed of rubber or another elastically deformable material that returns to its original shape when the deforming force is removed. The buckle tongue stop may be formed with a raised portion, or bump, which is compressible or with more than one compressible bump, or, with bumps that move toward each other in deformation.

DETAILED DESCRIPTION OF THE INVENTION

The seat belt of the present invention has particular applicability to a three-point seat belt restraint has a length of belt webbing connected to the vehicle, at one end to the floor and at the other end to a retractor. The belt webbing passes over a loop fastened to a side pillar of the vehicle and through an aperture in a buckle tongue. The position of the buckle tongue is adjustable on the webbing since the webbing slides freely through the aperture. The buckle tongue can be inserted in a buckle fixed to the vehicle on an opposite side of the vehicle occupant so that, when buckled, the belt passes over both the lap of the vehicle occupant and diagonally across the vehicle occupant's torso. When the seat belt is unbuckled, spare belt webbing is automatically wound into the retractor and adopts a length corresponding to the distance between the retractor and the pillar loop and the buckle tongue tends to slide down the webbing. To ensure that the buckle tongue hangs in a position accessible to a vehicle occupant, it is known to put a buckle tongue stop in the form of a button on the webbing at a suitable location to prevent the buckle tongue from falling all the way to the floor.

Figure 1:
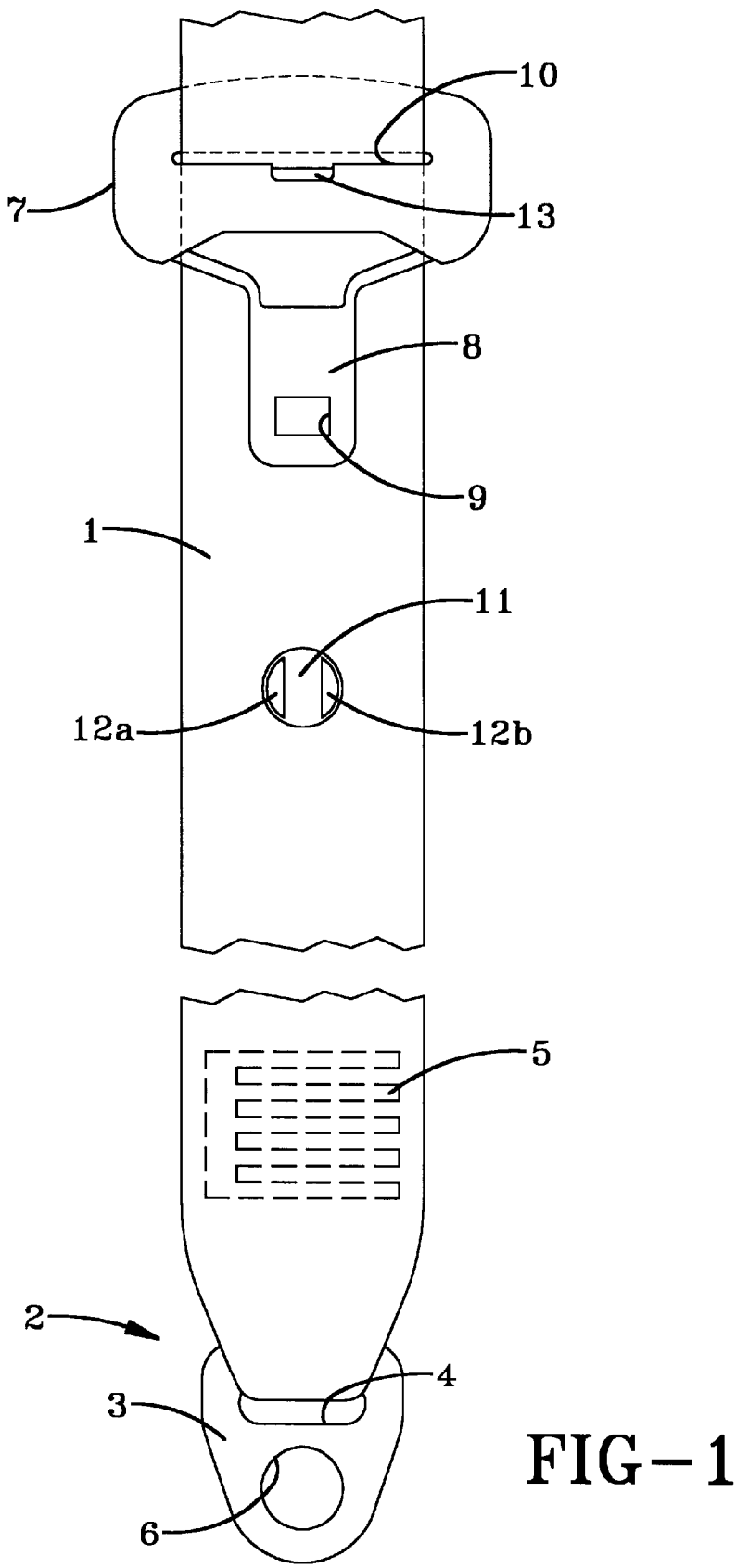
FIG. 1 is a schematic view of a section of seat belt webbing according to the present invention.

FIG. 1 shows a section of a seat belt according to the present invention that has seat belt webbing 1 attached at one end 2 to a load bearing seat belt anchor 3 by being looped through a slot 4 on the seat belt anchor 3 and secured by stitches 5 through two layers. The seat belt anchor 3 is fastened to the floor of a vehicle by a bolt (not shown) passing through a hole 6 in the seat belt anchor.

A buckle tongue 7 comprises a narrow latching portion 8 with a square aperture 9 therein. The main body of the buckle tongue has a slot 10 therein with the slot having a central wider part forming a channel 13. The narrow latching portion 8 fits into a buckle (not shown) to fasten the belt 1 around an occupant of a vehicle. A latching bolt in the buckle passes through the square aperture 9 to secure the seat belt to the belt webbing.

The buckle tongue 7 is free to slide on the belt webbing 1 passing through the slot 10 but movement of the buckle tongue is limited by a buckle tongue stop 11 that prevents the buckle tongue from falling down the belt webbing into an inaccessible position in the vehicle when the buckle tongue is not latched to a buckle. The buckle tongue stop 11 is in the form of a button embedded in, or embossed on, the belt webbing 1 at a suitable location. The buckle tongue stop effectively thickens the belt webbing 1 to a thickness that is thicker in normal use than the width of the slot 10 in the buckle tongue and is wider than the channel 13 associated with the slot 10.

The buckle tongue stop 11 is resiliently flexible so that the buckle tongue stop can be forced through the slot 10 in the buckle tongue 7 if a child seat is being fastened in place.

The illustrated buckle tongue stop 11 is flexible in the direction of its width, that is to say laterally, but flexibility in the direction of the thickness of the buckle tongue stop would also work well. The buckle tongue stop has two semi-circular raised portions 12a, 12b but one skilled in the art will understand that many possible configurations can be envisaged to achieve the correct level of resilient deformability. The buckle tongue stop must be deformable easily for it to be deformed by a normal person since it is required to be deformed by an end user of the vehicle in installing a child seat which is likely to be an everyday occurrence. On the other hand, the buckle tongue stop should not be too easily deformed since it is not desired that the buckle tongue slip over the buckle tongue stop unintentionally. For example, if only slight forces were needed to deform the buckle tongue stop then the buckle tongue 7 would fall to a position that is inconvenient to a seat occupant.

Figure 2:
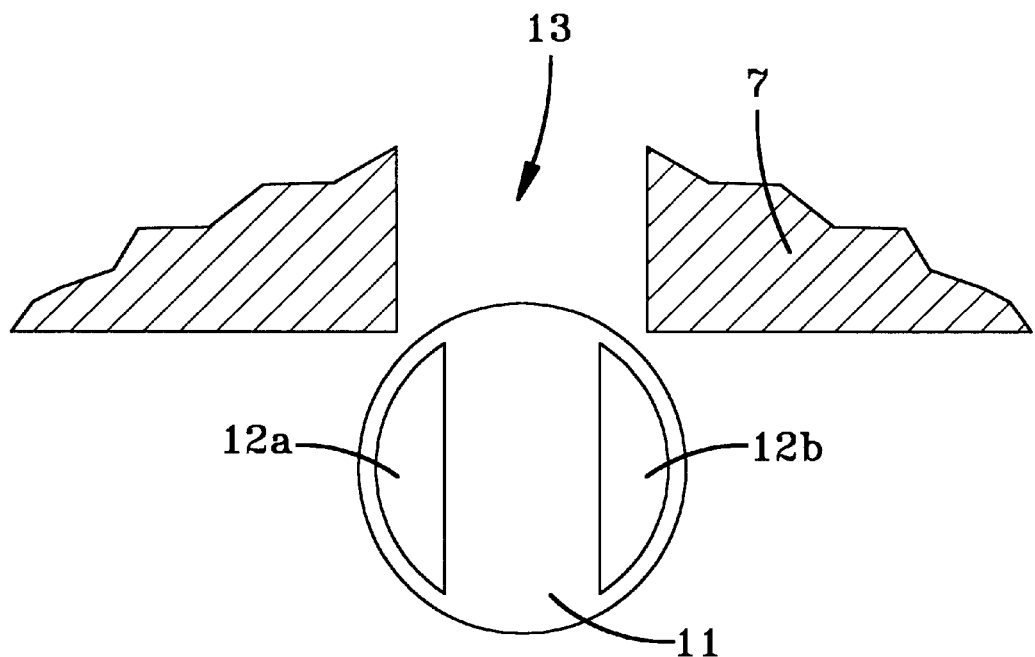
FIG. 2 is a schematic close up view of a section of the seat belt webbing of FIG. 1. in a first position relative to a buckle tongue.
Figure 3:
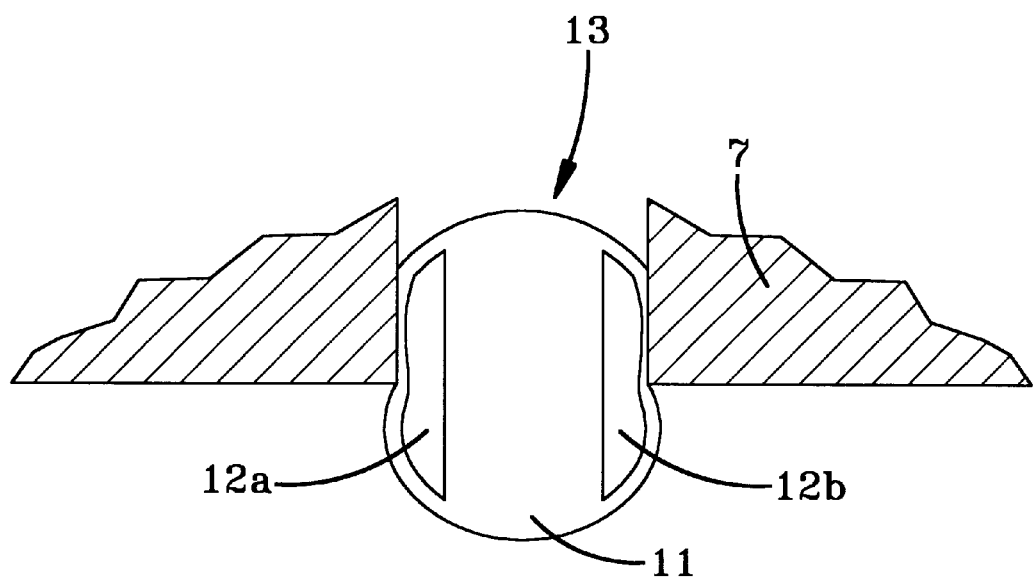
FIG. 3 is a schematic close up view of a section of the seat belt webbing of FIG. 1. in a second position relative to the buckle tongue.

FIGS. 2 and 3 illustrate the operation of the flexible buckle tongue stop 11 in more detail.

The buckle tongue stop 11 comprises a button of rubber or another elastically and resiliently deformable material that returns to its original size and shape when the deforming force is removed, and has a generally circular shape with two semi-circular raised portions or bumps 12a, 12b in horizontally opposed positions.

FIG. 2 shows the stowed position of the tongue and the slot 10 is in contact with the outer periphery of the buckle tongue stop 11. In FIG. 3 force is applied to the buckle tongue stop and the bumps 12a, 12b are deformed toward each other by the side walls of the channel 13 adjacent the slot 10 in the buckle tongue. The buckle tongue stop 11 is thus forced through the slot 10 and the buckle tongue 7 is no longer constrained by it so no loose belt webbing will arise in securing a child seat. After the buckle tongue has passed the buckle tongue stop 11, the bumps 12a, 12b return to their original positions so that the buckle tongue stop is effective to support the buckle tongue when the seat belt is to be used for an adult occupant.

Many changes and modifications in the above descried embodiments of the invention can, of course, be carried out without departing from the scope thereof. Accordingly, that scope is intended to be limited only by the scope of the appended claims.

We claim:

1. A seat belt comprising seat belt webbing in combination with a buckle tongue stop in the form of a button embedded in, or embossed on, the belt webbing, said button being resiliently deformable and comprising at least two laterally spaced raised portions that may be displaced toward each other by a predetermined force.

2. The seat belt according to claim 1 wherein the laterally spaced raised portions of the buckle tongue stop are deformable laterally.

3. The seat belt according to claim 2 wherein the buckle tongue stop is made of rubber.

4. The seat belt according to claim 1 wherein the buckle tongue stop is made of rubber.

5. The seat belt according to claim 1 further comprising a buckle tongue that has a slot therethrough, the belt webbing passing through said slot, said buckle tongue being free to lode on the belt webbing with movement of the buckle tongue limited by the buckle tongue stop.

6. The seat belt according to claim 5 wherein the buckle tongue stop can be forced through the slot in the buckle tongue to fasten a child seat in place.

7. The seat belt according to claim 1 wherein the raised portions of the buckle tongue stop are semi-circular.

8. The seat belt according to claim 1 wherein the buckle tongue stop comprises an elastically and resiliently deformable material that has a generally circular shape with two opposed semi-circular raised portions.

* * * * *